(12) United States Patent
Ljungström et al.

(10) Patent No.: US 10,602,746 B2
(45) Date of Patent: Mar. 31, 2020

(54) PRODUCT AND PROCESS OF PRODUCING A STERILIZED FLOUR

(71) Applicant: INNOVATIVE FOOD DESIGN IFD AB, Karlshamn (SE)

(72) Inventors: Mark Gudmund Ljungström, Karlshamn (SE); Bengt Lennart Lindahl, Lund (SE); Johan Claes Wilhelm Axelsson, Stockholm (SE)

(*) Notice: Subject to any disclaimer, the term of this patent is extended or adjusted under 35 U.S.C. 154(b) by 0 days.

(21) Appl. No.: 15/567,562

(22) PCT Filed: Apr. 25, 2016

(86) PCT No.: PCT/EP2016/059204
§ 371 (c)(1),
(2) Date: Oct. 18, 2017

(87) PCT Pub. No.: WO2016/170189
PCT Pub. Date: Oct. 27, 2016

(65) Prior Publication Data
US 2018/0027825 A1    Feb. 1, 2018

(30) Foreign Application Priority Data
Apr. 23, 2015 (SE) ....................... 1550483

(51) Int. Cl.
*A21D 6/00* (2006.01)
*A21D 2/16* (2006.01)
(Continued)

(52) U.S. Cl.
CPC .............. *A21D 6/003* (2013.01); *A21D 2/14* (2013.01); *A21D 2/16* (2013.01); *A21D 2/262* (2013.01);
(Continued)

(58) Field of Classification Search
CPC .......... A21D 6/003; A21D 2/16; A21D 2/262; A23P 30/20
(Continued)

(56) References Cited

U.S. PATENT DOCUMENTS 3,784,710 A * 1/1974 Earle et al.
3,908,031 A   9/1975 Wistreich et al.
(Continued)

FOREIGN PATENT DOCUMENTS

EP    1808082 A1    7/2007
FR    2671266 A1    7/1992
(Continued)

OTHER PUBLICATIONS

International Search Report of PCT/EP2016/059204 Completed Sep. 9, 2016; dated Sep. 16, 2016 3 Pages.
(Continued)

*Primary Examiner* — Helen F Heggestad
(74) *Attorney, Agent, or Firm* — The Roy Gross Law Firm, LLC; Roy Gross

(57) ABSTRACT

The invention relates to a closed continuous process to sterilise flour to reduce the enzymatic activity within the flour as well as to reduce microbial contamination of the flour and thereby minimise pasting of the starch and maintaining the flour in its native form. The invention also relates to the flour obtained by the method as well as the use of the flour.

21 Claims, 1 Drawing Sheet

(51) Int. Cl.
  *A21D 2/26* (2006.01)
  *A23P 30/20* (2016.01)
  *A21D 2/14* (2006.01)
(52) U.S. Cl.
  CPC ............... *A21D 2/263* (2013.01); *A21D 6/00* (2013.01); *A21D 6/001* (2013.01); *A23P 30/20* (2016.08)
(58) Field of Classification Search
  USPC ....... 426/335, 622, 640, 504, 506, 508, 516, 426/517
  See application file for complete search history.

(56) References Cited

U.S. PATENT DOCUMENTS

2001/0015138 A1* 8/2001 Huber et al.
2006/0013932 A1* 1/2006 Ljungstrom

FOREIGN PATENT DOCUMENTS

| JP | 59159757 | * | 9/1984 |
| JP | 10094369 | * | 4/1998 |
| WO | 2004037002 | A1 | 5/2004 |

OTHER PUBLICATIONS

Written Opinion of ISR of PCT/EP2016/059204 Completed Sep. 9, 2016; dated Sep. 16, 2016 7 Pages.
International Preliminary Report on Patentability of PCT/EP2016/059204 Completed Jul. 11, 2017 20 Pages.

* cited by examiner

PRODUCT AND PROCESS OF PRODUCING A STERILIZED FLOUR

This application is a National Phase of PCT Patent Application No. PCT/EP2016/059204 having International filing date of Apr. 25, 2016, which claims the benefit of priority of Sweden Application No. 1550483-0 filed on Apr. 23, 2015. The contents of the above applications are all incorporated by reference as if fully set forth herein in their entirety.

FIELD OF THE INVENTION

The invention relates to a closed continuous process to sterilise flour and to reduce the enzymatic activity within the flour as well as to reduce microbial contamination of the flour and thereby minimise pasting, i.e. gelatinisation, of the starch and maintaining the flour in its native form. The invention also relates to the flour obtained by the method as well as the use of the flour.

BACKGROUND OF THE INVENTION

When grains are grown in the fields, the final quality is very dependent on the climate. If bad weather persists, and/or it is very windy so-called layers are produced, which often result in that the grains possess a high diastatic activity. High diastatic activity means that enzymes are produced/synthesised within the grains, which breaks down the starch during the use of the grain within the food industry or baking in households.

One way to screen the quality of the grains after harvest is to use the so-called Falling Number, which is a number obtained by a method which measures the diastatic activity. A high Falling-Number implies low diastatic activity and viceversa, which means that, grains obtaining a low Falling-Number has a high enzymatic activity and has been growing under bad conditions in the field. When high enzyme activity is prevalent, the microbial contamination level in the grains is most often high. Grains possessing high diastatic activity and a high microbial contamination level is not suitable for the production of flour to be used in food products, but is used instead for the production of animal feed, which reduces the economic value for the farmer.

Heat treatment of flour is one way to reduce enzymatic activity. However, high heat treatments result in colour changes and taste changes of the flour, as well as clumps of the flour. Furthermore, reduction of the microbial level is not satisfactory since the use of heat treatment has to be conducted in a sufficiently dry environment to avoid problems such as gelatinisation of starch within the flour. If this happens, the basic properties of the flour become altered. It is previously known that a reduction of microbes takes place more efficiently in the presence of water. To sterilise dry flour, using heat only, requires keeping the flour at about 180° C. for about 3 hours. This negatively affects the flavour, colour and the starch water absorbing capacity.

Another method to reduce the number of bacteria is to irradiate with gamma-rays. However, from the consumer's viewpoint, the technology is intuitively negative, which has resulted in negligible use of this method in industry, even though it is permitted within the EU and by the Swedish Food Agency to be used to reduce the bacterial number in spices. Products may also be sterilised by other known techniques like, fumigation using, for example, ethylene oxide, propylene oxide and sulphur dioxide. The first two mentioned gases lead to formation of toxic products, such as chlorohydrins, which is why the method using fumigation is forbidden in more and more countries all over the world. Sulphur dioxide is very toxic, and forms a hazard to the industrial staff, who have to perform the fumigation. A common example of the use of this method is the conservation of different fruitpulp masses. Sulphur dioxide is also regarded as an allergen, and has to be declared on the food label as such.

Surfaces have, since the beginning of the 1900's, been disinfected with ethanol (e.g. 70% volume/volume), both within healthcare and the food industry. Ethanol of 70% strength has proven to be effective towards vegetative bacteria, but insufficiently effective towards bacteria in the spore stages, which survive the treatment. Since these spores even survive the heat treatment to which the flour is exposed to during the baking process this method is far from satisfactory. At the same time, the use of ethanol does not contribute to a reduction of excessive enzymatic activity in the flour.

So far sterilising processes using ethanol have been focusing on batch sterilising systems which have the drawbacks that after each batch the complete system need to be cleaned and the process restarted. A huge draw back, which result in that it is not suitable to use in a commercial production plant. Further on, a number of techniques to minimize microorganisms in powders and flours are claimed to sterilize, even though the techniques do not actually sterilize, since these processes result in powder/flour that still contains spores etc. These techniques include known batch- and continuous production techniques and may sometimes involve ethanol.

In order to prepare a sterile liquid mixture with long shelf life the flour should be sterile before mixing with a sterile liquid. If spores remain in the flour, these spores can grow to bacteria after it has been mixed with the liquid resulting in a non-sterile liquid with reduced shelf life. The common UHT technique to sterilize liquids is not suitable for liquids containing flour since the starch will gelatinize resulting in a product without remaining baking properties.

The present invention provides a new process, which enables the possibility to sterilise flour in a closed system continuously. The method is also an effective method to sterilise the flour without severely changing the properties of the flour, such as the baking properties of the starch in the flour. The method further reduces the enzymatic activity within the flour and eliminates unfavourable microbes present within the flour, including spores.

SUMMARY OF THE INVENTION

The invention relates to a number of problems which are solved by the process as disclosed in the claims.

In a first aspect the invention relates to a continuous closed process to sterilise a flour mixture, comprising the steps of: providing a mixture comprising one or more flour(s) in ethanol, introducing said mixture into an extruder comprising one or more zones with temperature above the boiling point of ethanol, wherein said zones with elevated temperature, i.e. where the temperature is above the boiling point of ethanol, creates a pressure in the mixture above 1 bar, and obtaining a sterile flour mixture and wherein the process is under aseptic conditions during the steps. The process is under aseptic conditions, i.e. it is closed, so that the mixture, by heating it to a temperature above the boiling point of ethanol, is exposed to a pressure above 1 bar, i.e. an superatmospheric pressure, of ethanol vapour.

By such a process it is for the first time possible to sterilise flour continuously by the use of an extruder. A number of problems well-known for a person skilled in the art have been solved by the invented process. This includes that it is possible to run the process continuously and also reduce the costs by using flour of different qualities according to Falling Number. In particular the manufacturing costs could be lowered by using cheaper flour of lower quality, i.e. of lower Falling Number.

Further it is possible to reduce and/or eliminate the development of clumps within the flour mixture, clumps of flour wherein the bacteria or microorganism can possibly survive during the sterilisation process and no sterilised flour will be obtained after the process. The clumping problem may be eliminated by the addition of for example one or more fat ingredients, preferably one or more high fat ingredients. This is an important technical feature which secures that no clumps are formed and thus no bacteria can remain in the final flour that are alive and could continue to divide and destroy the flour, or at least the risk is minimized. Less clumps in the flour mixture also makes it easier to mix the sterile flour with e.g. sterile liquid.

Additionally, it is of importance that the system is closed to be able to increase the pressure within the extruder and thus increase the temperature above the boiling point of ethanol, which is about 78° C., which otherwise evaporates the ethanol which should solely be present for sterilisation purposes and after that removed.

Another advantage is that the fat ingredient does not oxidise during the sterilisation process and thus no change in the taste occurs.

In a second aspect the invention also relates to a sterile flour mixture comprising one or more flour(s) and one or more fat ingredient(s), wherein the fat ingredient(s) is/are present in an amount of from about 0.5 to about 50% (w/w).

In a final aspect the invention relates to the use of the above mentioned sterile flour mixture.

Further advantages and objects with the present invention will be described in more detail, inter alia with reference to the accompanying drawings.

DETAILED DESCRIPTION OF THE INVENTION

Definitions

The term "fat ingredient(s)" is intended to mean an ingredient containing more than 20% fat.
The Process
The invention relates to a continuous closed process to sterilise a flour mixture, comprising the steps of:
  a) providing a mixture comprising one or more flour(s) and ethanol,
  b) introducing said mixture into an extruder comprising one or more zones with temperature above the boiling point of ethanol, wherein said one or more zones with elevated temperature, i.e. with temperature above the boiling point of ethanol creates a pressure above 1 bar, such as an overpressure, and
  c) obtaining a sterile flour mixture and wherein the process is closed during the steps.

The continuous closed process to sterilise a flour mixture may further comprise a step of evaporating/flashing ethanol from the mixture.

The flour mixture may comprise one or more different flour(s) or solely one. The flour to be sterilised contains starch. The flour may be selected from the group consisting of wheat flour, oat flour, barley flour, rye flour, buckwheat flour, rice flour, soy flour, corn flour, quinoa flour, amaranth flour, sorghum flour, tapioca flour, bean and legume flours, floridian flour, algae flours or any other starch containing flour or mixtures thereof. In a specific example the flour is wheat flour. Further other ingredients may be present in the flour mixture to for example improve taste of the final product. Another example being milk powder.

The flour mixture may also comprise one or more fat ingredient(s), such as vegetable fat(s) which eliminates that the flour could clump and thus eliminates the possibility that bacteria being alive, remains in the flour mixture after processing. Examples of fat ingredients includes egg-powder, milk powder, emulsifier (e.g. lecithin) or vegetable fat, animal fat or other food approved fats and ingredients with high fat content, or mixtures thereof.

Ethanol may be present in an amount of from about 3 to about 40% (w/w), such as 5 to about 20% (w/w), such as from 7 to about 20% (w/w) or from about 5 to about 15% (w/w) or from about 8 to about 16% (w/w). Other percentages are shown under the examples.

The fat ingredients may be present in an amount of from about 0.5 or 1 to about 50% (w/w), such as about 2 to about 30% (w/w) or about 5-10% (w/w), or 1, 2, 3, 4, 5, 6, 7, 8, 9, 10, 11, 12, 13, 14 or 15% (w/w).

One example being a flour mixture wherein the flour is wheat flour and the fat ingredient is egg-powder and the egg-powder is present in an amount of about 10% (w/w).

Figure 1:
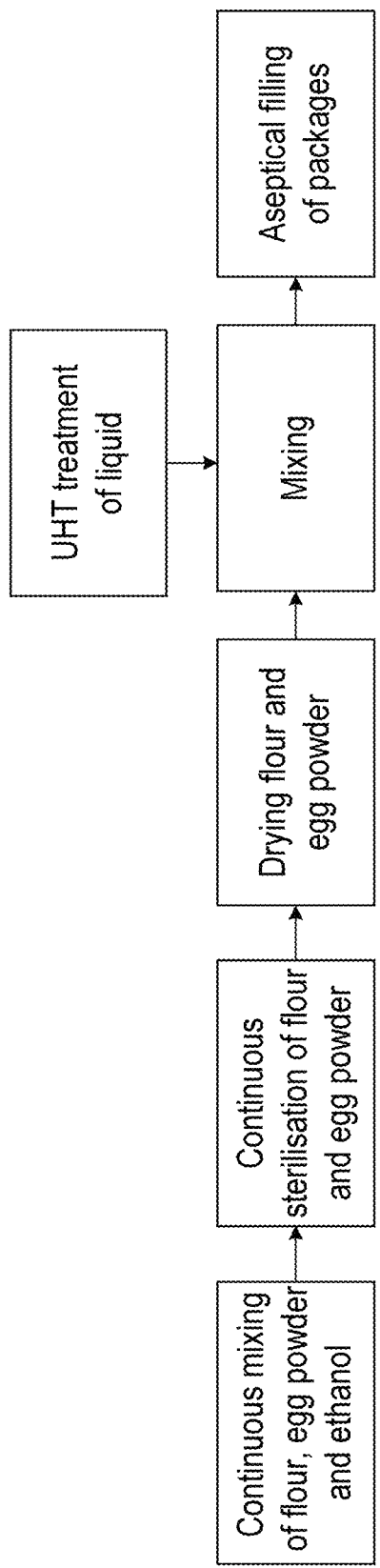
FIG. 1 shows one example of the sterilisation process.

FIG. 1 shows an overview of one embodiment of the process in which, in a first step, flour is continuously mixed with egg powder (fat ingredient) and ethanol. This mixture is then sterilised in the extruder whereafter the ethanol is allowed to evaporate. In this embodiment the end product is a mixture of the sterilised flour and a sterilised liquid, such as a pancake mix, thus the next step encompasses mixing the now sterile mixture of flour and egg powder with UHT treated sterile liquid, such as UHT treated sterile milk, before packaging the product in an aseptic package.

The flour mixture is introduced into an extruder, which may be a single or twin-screw type extruder or any type of screw composition that can create a pressure above 1 bar, e.g. by creating at least on airtight zone in which the mixture can be heated above the boiling point of ethanol, such as Extruder Coperion ZSK43MV. By the use of Extruder Coperion ZSK43MV it is possible to run from about 110 to about 330 kg each hour, however, with other extruders a wider range of production rates, such as e.g. 10 to 5000 kg/h, is possible.

Previous experiments have revealed that sterilisation of flour with ethanol requires a temperature above the boiling point of the ethanol. However, a normal extruder screw which conveys a flour/ethanol-mixture while heating it through the surrounding barrel would not be able to heat the flour/ethanol mixture above the boiling point of the ethanol. Even if the barrel temperature is far above the boiling point for ethanol the temperature of the mixture remains close to the boiling point until all the ethanol has evaporated. In order to be able to heat the mixture above the boiling point, and at the same time keep the ethanol in the mixture, it is necessary to have the process closed so that an overpressure or a superatmospheric pressure can be obtained. If there is an overpressure, i.e., above 1 bar, the ethanol will boil at a higher temperature, thus the ethanol stays in the mixture and the mixture can be heated above the boiling point of the ethanol.

However since flour is in powder form and since the current invention deals with a continuous process, where new flour continuously should enter the process and processed flour should leave the process continuously, it is difficult to obtain a processing zone with overpressure. Even with the addition of e.g. ethanol the flour is still a porous material. The addition of ethanol does not create a dough, like water would have done. For example with 20% added ethanol wheat flour still looks like powder, but it is a bit moist, like humid sand. Because of this a special configuration of the extruder is needed.

The extruder comprises one or more zones in which the flour mixture is transported and wherein a necessary pressure and temperature is created. The screw and temperature causes a pressure being an overpressure in the mixture above 1 bar. The extruder screw can be configured with certain angle of the screw blade/profile in order to cause a pressure over 1 bar. Such a configuration of the screw can also be adjusted to achieve zones with a high pressure that compresses the powder(flour)/ethanol mix so that it becomes airtight and can hold the ethanol inside the mixture even if the mixture goes above 78° C. which is the boiling temperature for the ethanol.

The zones may be created by the screw of the extruder, which due to the configuration of the extruder screw blades, or due to the provisioning of restricting orifices or the like, compresses the mixture so as to form an airtight plug of the mixture. This may be obtained by an extruder screw having a section with blades configured to slow down, halt or even reverse the transport of the mixture through the extruder. At such a section flour will be compressed so that it forms the airtight plug. Preferably the extruder is configured, by suitably configuring the screw of the extruder to comprise two such sections. These two sections will then, in operation, provide two airtight plugs of the mixture, which plugs, together with the enclosure, i.e. the extruder barrel, of the extruder enclose an airtight volume in which the mixture can be heated above the boiling temperature of the ethanol.

Alternatively the extruder may be configured with a suitably small extruder outlet such that the restriction to flow through the outlet causes the mixture to be compressed to such an extent that the whole mixture in the extruder can be considered an airtight plug.

The above can also be expressed on the basis of the filling degree of the extruder. Normally e.g. a twinscrew type extruder does not need to be full during operation, it could have e.g. a 50% filling degree. The filling degree depends on how much is fed into the extruder and also on the screw configuration and if there is a nozzle or valve etc. at the end of the extruder that limits the flow through the extruder. Concerning the screw configuration, the screw can have different profiles which transports the mixture with different speeds, or a profile that even hinders or limits the product. The screw can also have a profile which creates a counter flow that pushes the product backwards. Different screw profiles along the screw affects the filling degree so that some sections can have a 100% filling degree and other sections e.g. 50% filling degree. A screw with a section that transports the product with high speed and 50% filling degree followed by a screw section with steeper angle (lower helix angle) of the screw profile/blade which gives a slower transport of the mixture can result in a 100% filling degree in this slower section. For example by configuring the screw so that two or more sections along the screw have 100% filling degree and where the moist flour/ethanol mix is highly compressed, for example through counter flow elements that pushes the mixture backwards, two or more airtight sections can be obtained with an airtight volume between the two airtight sections. This is illustrated in FIG. 2 which shows an extruder suitable for performing the process of the present invention.

When heat is now applied so that temperature of the mixture reaches higher than the boiling point for the ethanol in the mixture, the ethanol steam can result in an overpressure. How high the overpressure will be depends on the temperature and what overpressure the airtight sections can contain. The better the flour/ethanol-mix is compressed the higher the pressure and the temperature can be. An airtight plug/zone with compressed flour/ethanol-mixture can also be achieved if the barrel and screw size is decreased at the end or in other way configured to restrict the flow, as described above, so that the flour ethanol mixture is compressed, e.g. through a restricted end opening of the extruder. Instead of counterflow elements the screw can also have a flat disk, either being smaller than the inner diameter of the extruder barrel so as to allow the mixture to pass, at a reduced rate, along the circumference of the disk, or alternatively by having one or more apertures/holes in the disk, on the screw that restricts the flow or other profiles that restricts the flow so that the mixture is compressed. Normally extruders measure the barrel temperature and not the temperature of the product in the processing section. This since the screw could otherwise tear of the temperature probe. In order to know the temperature a pressure gauge can be installed in the barrel. Through the measured overpressure by ethanol vapour the actual temperature that the mixture reaches can be calculated.

This will now be described with reference to FIG. 2 which shows an extruder 10 suitable for performing the process. Extruder 10 comprises an extruder barrel 12 having an inlet end with an inlet 14 and an outlet end 16. A hopper 18 is positioned so as to allow the mixture 2 of flour and ethanol, and optionally one or more fat ingredients such as egg powder, to enter the extruder 10 at the inlet 14. An extruder screw 20 extends through the extruder barrel 12 and comprises an extruder shaft 22 and extruder screw blades 24. The extruder screw blades 24 have different pitch along the length of the extruder 20, in particular a first section 26 of the extruder screw blades 24 has a steep forward pitch quickly transporting, when the extruder screw 20 is turned as indicated by the arrow designated the letter A, with a low degree of filling, the mixture from the inlet 14. The next section 28 decreases the pitch so that the degree of filling increases. The pitch and helix angle is further lowered in the next section 30 to achieve 100% filling degree. The first airtight plug of the mixture 2 is formed by section 32 which has a negative pitch compared to section 30, i.e. section 32 is a counterflow element/section of the screw 20 thus pushing the mixture back towards the section 30. This causes compresses, or compacts, the mixture at and between the sections 30 and 32 so that the mixture becomes airtight. The mixture from the sections 30 and 32 is then transported by the section 34 into a longer section 36 which is delimited on one side by the sections 30, 32 and 34, and on the other side by the sections 38 and 40, where 40 is a counterflow element/section to create a further airtight plug. The airtight plugs created by sections 30, 32 and 38, 40 enclose, together with the extruder barrel 12, an airtight zone or volume 42. This zone which extends over the sections 34, 36 and 38 is then heated, as indicated by the arrows, of which one is designated the reference numeral 44, to a temperature above the boiling point of the ethanol. This causes an overpressure, due to the vapour pressure of the ethanol, which can be measured by pressure gauge 46. After the mixture has been treated in the airtight volume 42 it is transported out of the extruder outlet 16 by the sections 48 and 50 where the ethanol evaporates, as it is no longer in the airtight volume 42, as shown by arrow 52 and the sterilised flour is obtained as shown by arrow 54.

Figure 2:
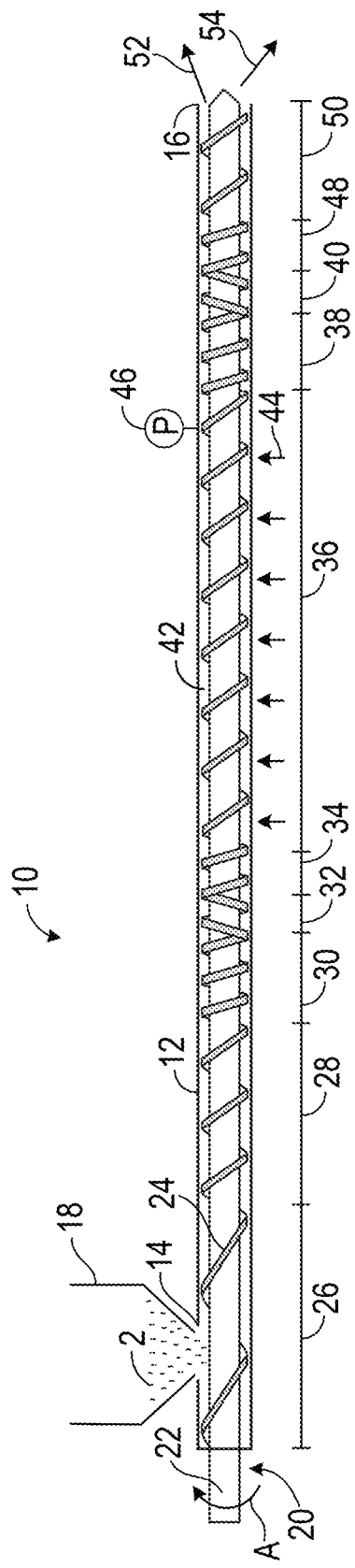
FIG. 2 shows an extruder suitable for performing the process.

In the shown example in FIG. 2 all ingredients are premixed and added together. Flour, egg powder and ethanol can instead be added separately and the extruder can then also in the beginning be equipped with other screw profiles, so called kneading blocks that increases the mixing of the ingredients. Such configurations have been tested successfully.

The feeding speed in the extruder can be from about 10 to about 5000 kg/h, such as from about 100 to about 350 kg/h The temperature in the extruder is from just above the boiling point of ethanol to about 350° C., such as from about 90° C. to about 250° C., such as 78, 100, 150 or 200° C., and the pressure is at least 1 bar and up to 20 bars, such as 1, 2, 3, 4, 5 or 6 bars, such as from 1 to 6 bars, 1-4 bars or 1-3 bars or 1-2 bars.

Another advantage of the present method is the short processing time needed. In experiments with the extruder the time from the flour and ethanol entered the extruder until it came out was only 25 seconds at 110 kg/h and 18 seconds at 150 kg/h. This was measured by adding colouring at the inlet where wheat flour was dosed into the extruder. A short residence time is good to preserve flavour, colour and functional properties of the processed product and it could also save energy costs. Further on, if the production stops during manufacture and the product being processed needs to be discarded it is only a small amount in the extruder. For larger extruders longer residence times may occur, however preferably the residence time should be less than 5 minutes, such as less than 2 minutes, or preferably less than 25 seconds.

After the flour mixture has been sterilised it may be stored in an aseptically package having different sizes depending on the final use of the sterilised flour.

Optional, the continuous closed method may further comprise a step e), wherein a transporting screw transports the sterile flour mixture for further treatment or packaging.

Further the sterilised flour mixture or any like mixture may be mixed with a sterile liquid in a mixer to obtain a sterile mixture of flour and liquid. The liquid may be water or any milk product. In the mixing step or prior to filling into packages additional sterile ingredients such as flavour, taste and leavening agents may be added. The mixing step is before packaging.

Further additional sterile ingredients include colour, vitamins and enzymes, which may be added for example through sterile membrane filtration and then injected into the sterile liquid mixture. Prior to sterile membrane filtration flavour, colour, leavening agents (e.g. sodium bicarbonate), vitamins and enzymes may be dissolved in e.g. water to enable sterile membrane filtration. A sterile flour liquid mixture has the advantage of long shelf life and no need for preservatives or fridge storage.

A sterile liquid flour mixture containing non-gelatinised flour will normally get sedimented during storage where the flour will fall to the bottom. Such a sedimented liquid must be shaken or kneaded before use. If the sedimentation is hard it can be difficult to get it homogenous again. In order to minimize sedimentation stabilisers, such as xanthan, carrageenan, guar, modified starch, etc. can be included in the recipe. Another new method, which is part of the current invention, is to transform some of the starch in the flour to cold swelling starch which works as a stabiliser in the mixture. During the experiments to sterilise by an extruder it has been noted that a small part of the starch is converted to cold swelling starch during the process which results in less sedimentation after mixing with a liquid and also a softer sedimentation that is easier to get homogenous again. The amount of starch that is converted depends on several factors. Higher heat results in that more is converted to cold swelling, while higher ethanol percentage results in less being converted. Also the screw configuration affects so that a screw which uses more energy to process the flour results in more of the starch is converted to cold swelling. It is easy to find an appropriate level where about 1-30% is converted depending on the end product. Another solution to handle the sedimentation is to make it easier to shake the sterile liquid flour mixture. By providing a headspace, such as 1-10% of the total volume of the packaging, inside the aseptic packaging it is easier to shake the product and get it homogenous. One solution used by the industry for sterile packaging is to inject sterile air or gas (e.g. nitrogen or carbon dioxide) into the liquid before filling. The air or gas forms bubbles/froth in the liquid. After the liquid has been filled and the products sets the small bubbles bursts successively and forms a head space in the package.

All forms of sterile packages, which are filled through "aseptic technologies" or under sterile conditions may be used for the sterilised flour mixture or mixtures mentioned in the invention.

Examples of aseptically packed mixtures includes, pancake mixes, waffle mixes, mixtures for batters as well as cake mixtures for e.g. spongecakes, cakes and muffins, as well as bread mixes.

The ethanol used in the process can be condensated and reused, but it will depending on the processing temperature contain some water from the moisture in the flour. If the water content is too high the ethanol could be strengthened through vapour or liquid membrane filtration (pervaporation or vapour permeation) or it could be distilled or be fractionally distilled through as distillation column).

A Sterile Flour Mixture

In a second aspect the invention relates to a sterile flour mixture obtainable by the method as disclosed above or a sterile flour mixture comprising one or more flour(s) and one or more fat ingredient(s), such as vegetable fat present in an amount of from about 0.5 to about 50% (w/w), such as about 1 to about 15% (w/w), such as about 2 to about 10% (w/w) or about 3-7% (w/w), or 1, 2, 3, 4, 5, 6, 7, 8, 9, 10, 11, 12, 13, 14 or 15% (w/w). One example is a flour mixture wherein the flour is wheat flour and the vegetable fat ingredient is egg powder and the egg-powder is present in an amount of about 5% (w/w).

The flour present in the mixture comprise one or more flour(s) selected from the group consisting of wheat flour, oat flour, barley flour, rye flour, buckwheat flour, rice flour, soya flour, corn flour, quinoa flour, amaranth flour, sorghum flour, tapioca flour, bean and legume flours, floridian flour, algae flours or any other starch containing flour or mixtures thereof.

The one or more fat ingredient(s) are selected from the group consisting of egg-powder, milk powder, emulsifier (e.g. lecithin) or vegetable fat, animal fat or other food approved fats and ingredients with high fat content, or mixtures thereof.

Finally the invention relates to the use of the process or the sterile flour mixture as defined above.

The flour in the sterilised flour liquid mixture remains in a non-gelatinised condition after the sterilisation, which means that the product could be stored in room temperature prior to use.

Following examples are intended to illustrate, but not to limit the invention in any manner, shape, or form, either explicitly or implicitly.

EXAMPLES

Example 1

A number of experiments were performed wherein the amount of ethanol was 8.55%, 12% or 16% together with different temperatures as well as different amount of egg powder (0%, 5%, 10% and 20%). The ethanol used contained 96% (weight) ethanol and the rest was water.

Some of the experiments are shown below in the table.

| Test | Mixture | Temp (° C.) | Pressure | Amount (kg) |
|---|---|---|---|---|
| 1 | 80% wheat 20% egg + 8.55% ethanol | 190 | 5 bar | 150 |
| 2 | 80% wheat 20% egg + 8.55% ethanol | 130 | 3 bar | 110 |
| 3 | 80% wheat 20% egg + 8.55% ethanol | 150 | 3-4 bar | 110 |
| 4 | 80% wheat 20% egg + 8.55% ethanol | 170 | 3-5 bar | 110 |
| 5 | 80% wheat 20% egg + 8.55% ethanol | 190 | 4-5 bar | 110 |
| 6 | 80% wheat 20% egg + 8.55% ethanol | 210 | 5 bar | 110 |
| 7 | 80% wheat 20% egg + 8.55% ethanol | 210 | 5 bar | 150 |
| 8 | 80% wheat 20% egg + 8.55% ethanol | 210 | 5 bar | 110 |
| 9 | 90% wheat 10% egg + 8.55% ethanol | 170 | 7 bar | 110 |
| 10 | 100% wheat + 8.55% ethanol | 110 | 3 bar | 110 |
| 11 | 100% wheat + 8.55% ethanol | 150 | 3 bar | 110 |
| 12 | 100% wheat + 8.55% ethanol | 170 | 4 bar | 110 |
| 13 | 100% wheat + 8.55% ethanol | 190 | 6 bar | 110 |
| 14 | 90% wheat 10% egg + 8.55% ethanol | 150 | 5-7 bar | 110 |
| 15 | 90% wheat 10% egg + 12% ethanol | 150 | 3-4 bar | 110 |
| 16 | 90% wheat 10% egg + 16% ethanol | 150 | 3 bar | 110 |
| 17 | 80% wheat 20% egg + 8.55% ethanol | 170 | 3-4 bar | 180 |
| 18 | 90% wheat 10% egg + 8.55% ethanol | 90 | 2 bar | 110 |

The temperature listed in the above table is the temperature of the barrel of the extruder. The pressure is the vapour pressure (absolute) recorded in the airtight zone. The percentage of ingredients listed under "Mixture" should be interpreted as that "90% wheat 10% egg." means that this was the relation between wheat and egg powder (90/10). "+8.55% ethanol" means that ethanol was added so that is corresponded to 8.55% of the total mixture including the wheat, egg powder and ethanol. This would correspond to a mixture of 90 kg wheat, 10 kg egg and 9.35 kg of 96% (weight) ethanol.

The temperature of the mixture after it came out of the extruder, which is after the ethanol had flashed away, was around 80-85° C. Due to the measure high vapour pressure in the extruder the temperature of the mixture reached a higher temperature in the processing zone, but when the ethanol flashes away at the end of the extruder the temperature quickly drops close the boiling point of the ethanol.

Samples of treated flour from the experiments listed in the table were collected at the end of the extruder. All the experiments in the tables resulted in a sterilised flour, where no yeast, mould or bacteria were detected after microbiological culture evaluation. The evaluation method was NMKL 86, 4. Ed., 2006 for total aerobic microorganisms and NMKL 86, 4. Ed., 2005 for yeast and mould. The detection level was <1 cfu per gram. However the untreated wheat flour, which was evaluated two times, contained 1139 and 11000 cfu/g in terms of aerobic microorganisms; <10 and 70 cfu/g in terms of yeast; and 130 and 330 cfu/g in terms of mould. The values for the untreated egg powder which was evaluated one time was 20 cfu/g in terms of aerobic microorganisms; <10 cfu/g in terms of yeast; and 10 in terms of mould.

Also the enzymatic activity in the form of amylase and lipase was evaluated for some samples of treated flour. If flour is mixed with water any present amylase will start to break down starch into maltose, so that the flour eventually will loose its baking properties. This is a further limitation to shelf life for liquid flour mixtures. In order to eliminate amylase from wheat flour a temperature of about 85° C. is needed when the amylase is present in a liquid. Any present lipase enzyme in a flour/water mixture will break down the fat in the mixture, which also impart the shelf life of liquid flour mixture. Lipase is eliminated at about 100° C. when flour is treated at 10 minutes with dry heat. Lipase can even survive in small amount after UHT treatment of milk (142 C at 3-5 sec). Since the temperature needed to eliminate amylase and lipase is above the gelatinization temperature of wheat starch such an elimination can not be obtained after the sterilised flour has been mixed with water. It would therefore be very positive if the current flour treatment technique also would eliminate amylase and lipase even though the residence time in the experiments shown below only was 12-25 seconds. Amylase was evaluated with DNS-assay procedure. Lipase was evaluated with a test kit from called Oat-Chek from LSB Products (a division of ALTECA Ltd) 731 McCall Road, Manhattan, Kans. 66502 U.S.A.

In the untreated wheat flour amylase activity was found (0.335 mg maltose/ml was found after it had reacted with starch for 5 minutes at 30° C.). However in the 3 evaluated processed samples no amylase activity was found. The processed samples were:

Enzymatic activity test no 1: 95% wheat, 5% egg +8.55% ethanol, processed at 110° C. barrel temperature, pressure 3 bar, 110 kg/h.

Enzymatic activity test no 2: 90% wheat, 10% egg, +8.55% ethanol, processed at 170° C. barrel temperature, pressure 6 bar, 180 kg/h Enzymatic activity test no 3: 90% wheat, 10% egg, +8.55% ethanol, processed at 170° C. barrel temperature, pressure 6 bar, 240 kg/h.

Concerning lipase activity the same samples above showed no lipase activity (no blue colour was observed which indicate less than 0.00001 units of lipase per 0.1 g flour, when analysed according to the test instruction), while the untreated flour indicated about 0.1 units of lipase per 0.1 g flour (the sample changed to intense blue colour). These tests show that the present invention also significantly reduces or totally eliminates the enzymatic activity.

Sterilised flour from the experiments listed in the table above were tested for baking of pancakes, waffles and sponge cake. The baking tests were successful and this shows that the starch has remaining baking properties after the sterilisation with this technique.

In the experiments shown in table 1 the listed temperatures are the extruder barrel temperatures. The temperature in the mixture is often lower since it passes through quickly. Also the energy of the screw transfers heat into the mixture. In order to know the temperature the mixture reached we can instead look at the recorded vapour pressures in the table above and translate it through the table below. E.g. at a pressure of 4 bar the temperature was close to 120° C. The table below is for pure ethanol. The moisture in the flour could mix with the added ethanol and change the boiling point of the ethanol a little and also change the vapour pressure at a given temperature. Also the flour could possibly bind a little to the ethanol and impart the boiling point a little.

| Temp. (° C.) | Pressure (Bar) |
|---|---|
| 75 | 0.89 |
| 81 | 1.13 |
| 87 | 1.42 |
| 93 | 1.77 |
| 99 | 2.18 |
| 105 | 2.67 |
| 111 | 3.25 |
| 117 | 3.92 |
| 123 | 4.70 |
| 129 | 5.59 |
| 135 | 6.61 |
| 141 | 7.77 |
| 147 | 9.09 |

The invention claimed is:

1. A continuous closed process for sterilizing a flour mixture, the process consisting essentially of the steps of:
   providing a mixture including one or more flours and ethanol; and
   transporting the mixture through an extruder comprising one or more airtight zones, wherein, during the transporting step,
      the one or more airtight zones are obtained by compressing the mixture using a screw of the extruder to form one or more airtight plugs of the mixture in the one or more airtight zones, the one or more airtight plugs, together with an extruder barrel of the extruder, enclose the mixture within an airtight volume, and wherein the process further comprises:
      heating the mixture to between 78° C. and 350° C. in the one or more airtight zones, ethanol vapors that are formed due to the heating are enclosed in the airtight volume during the sterilization, and
      obtaining a pressure above 1 bar absolute in the one or more airtight zones,
      thereby resulting in the mixture being sterilized into a sterile flour mixture, such that at least 50% of the starch in the sterile flour mixture is non-gelatinized.

2. The continuous process of claim 1, wherein the pressure above 1 bar absolute is caused by the screw and the vapour pressure of the heated ethanol.

3. The continuous process according to claim 1, wherein at least 70% of the starch in the sterile flour mixture is non-gelatinized.

4. The continuous process of claim 2, wherein the screw comprises counter flow elements or a disk configured to restrict the transport of the mixture.

5. The continuous process of claim 1, wherein an outlet of the extruder is configured to restrict flow of the mixture through the outlet.

6. The continuous process of claim 1, wherein the barrel and screw size are configured to restrict the flow of the mixture.

7. The continuous process of claim 1, further comprising evaporating/flashing ethanol from the mixture after it has been sterilized.

8. The continuous process of claim 1, wherein the extruder is a twin-screw type extruder.

9. The continuous process of claim 1, wherein the feeding speed in the extruder is from about 10 to about 5000 kg/h.

10. The continuous process of claim 1, wherein the mixture is heated to between 78° C. to about 250° C. in the one or more airtight zones.

11. The continuous process of claim 10, wherein the mixture is heated to between 90° C. to about 200° C. in the one or more airtight zones and the vapour pressure of ethanol in the extruder is above 2 bar absolute.

12. The continuous process of claim 1, wherein ethanol is present in an amount of from about 3 to about 40% (w/w) in the mixture of one or more flours and ethanol.

13. The continuous process of claim 1, which further comprises mixing the sterile flour mixture with a sterile liquid to obtain a sterile liquid flour mixture.

14. The continuous process of claim 1, wherein the step of providing the mixture includes adding one or more fat ingredient(s) to the mixture, wherein the one or more fat ingredients are present in an amount of from about 0.5 to about 50% (w/w).

15. The continuous process of claim 1, wherein up to 30% of the starch in the flour is converted to cold swelling starch.

16. The process of claim 1, wherein the one or more flours is selected from the group consisting of wheat flour, oat flour, barley, flour, rye flour, buckwheat flour, rice flour, soya flour, corn flour, *quinoa* flour, amaranth flour, sorghum flour, tapioca flour, bean and legume flours, floridian flour, algae flours or any other starch containing flour or mixtures thereof.

17. The process of claim 1, wherein the one or more fat ingredient(s) is/are selected from the group consisting of egg-powder, milk powder, lecithin, vegetable fat or mixtures thereof.

18. The continuous process of claim 1, wherein the mixture of ethanol and flour does not create a dough or dough-like material.

19. The continuous process of claim 1, wherein the mixture, after leaving the extruder, is in the form of a powder or is powder-like.

20. A continuous closed process for sterilizing a flour mixture, the process comprising:
   providing a mixture including one or more flours and ethanol; and
   transporting the mixture through an extruder comprising one or more airtight zones, wherein, during the transporting step,
      the one or more airtight zones are obtained by compressing the mixture using a screw of the extruder to form one or more airtight plugs of the mixture in the one or more airtight zones, the one or more airtight plugs, together with an extruder barrel of the extruder, enclose the mixture within an airtight volume, and wherein the process further comprises:
      heating the mixture to between 78° C. and 350° C. in the one or more airtight zones, ethanol vapors that are formed due to the heating are enclosed in the airtight volume during the sterilization, and
      obtaining a pressure above 1 bar absolute in the one or more airtight zones,
      thereby resulting in the mixture being sterilized into a sterile flour mixture, such that at least 50% of the starch in the sterile flour mixture is non-gelatinized, wherein the residence time in the extruder for the mixture is less than 2 minutes.

21. A continuous closed process for sterilizing a flour mixture, the process comprising:
   providing a mixture including one or more flours and ethanol; and transporting the mixture through an extruder comprising one or more airtight zones, wherein, during the transporting step,
- the one or more airtight zones are obtained by compressing the mixture using a screw of the extruder to form one or more airtight plugs of the mixture in the one or more airtight zones, the one or more airtight plugs, together with an extruder barrel of the extruder, enclose the mixture within an airtight volume, and wherein the process further comprises:
- heating the mixture to between 78° C. and 350° C. in the one or more airtight zones, ethanol vapors that are formed due to the heating are enclosed in the airtight volume during the sterilization, and
- obtaining a pressure above 1 bar absolute in the one or more airtight zones, thereby resulting in the mixture being sterilized into a sterile flour mixture, such that at least 50% of the starch in the sterile flour mixture is non-gelatinized, wherein the water content in the mixture inside the airtight zone of the extruder is less than 21%.

* * * * *